(12) United States Patent
Curtis

(10) Patent No.: US 7,231,496 B2
(45) Date of Patent: Jun. 12, 2007

(54) METHOD, SYSTEM AND PROGRAM PRODUCT FOR CACHING DATA OBJECTS

(75) Inventor: John D. Curtis, Millbury, MA (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 10/662,539

(22) Filed: Sep. 15, 2003

(65) Prior Publication Data

US 2005/0060498 A1 Mar. 17, 2005

(51) Int. Cl.
*G06F 12/00* (2006.01)

(52) U.S. Cl. .................... 711/137; 711/118; 711/135

(58) Field of Classification Search ................ None
See application file for complete search history.

(56) References Cited

U.S. PATENT DOCUMENTS

| | | | | |
|---|---|---|---|---|
| 6,085,193 | A * | 7/2000 | Malkin et al. | 707/10 |
| 6,092,080 | A * | 7/2000 | Gustman | 707/103 |
| 6,157,993 | A * | 12/2000 | Lewchuk | 711/213 |
| 6,185,608 | B1 * | 2/2001 | Hon et al. | 709/216 |
| 6,266,742 | B1 * | 7/2001 | Challenger et al. | 711/133 |
| 6,360,273 | B1 | 3/2002 | Beurket et al. | |
| 6,363,397 | B1 | 3/2002 | Kitayama | |
| 6,453,404 | B1 * | 9/2002 | Bereznyi et al. | 711/171 |
| 6,505,200 | B1 * | 1/2003 | Ims et al. | 707/8 |
| 6,542,967 | B1 | 4/2003 | Major | |
| 6,662,274 | B2 * | 12/2003 | Subramoney et al. | 711/137 |
| 6,766,422 | B2 * | 7/2004 | Beyda | 711/137 |
| 6,823,514 | B1 * | 11/2004 | Degenaro et al. | 718/104 |
| 2001/0043600 | A1 | 11/2001 | Chatterjee et al. | |
| 2001/0054084 | A1 | 12/2001 | Kosmynin | |
| 2001/0056416 | A1 | 12/2001 | Garcia-Luna-Aceves | |
| 2002/0065809 | A1 | 5/2002 | Kitayama | |
| 2002/0073167 | A1 | 6/2002 | Powell et al. | |
| 2002/0078300 | A1 | 6/2002 | Dharap | |
| 2002/0133537 | A1 | 9/2002 | Lau et al. | |
| 2002/0143892 | A1 | 10/2002 | Mogul | |
| 2003/0009538 | A1 | 1/2003 | Shah et al. | |
| 2003/0051101 | A1 | 3/2003 | Burger et al. | |

OTHER PUBLICATIONS

Kanada, "Two Rule-Based Building-Block Architectures for Policy-Based Nework Control", Undated, pp. 1-10.
Haas et al., "Loading a Chache with Query Results", Proceedings of the 25th VLDB Conference, Edinburgh Scotland, 1999.
Patterson et al., "Informed Prefetching and Caching", Dec. 1995, pp. 79-95.

* cited by examiner

*Primary Examiner*—Jasmine Song
(74) *Attorney, Agent, or Firm*—John R. Pivnichny; Hoffman, Warnick & D'Alessandro LLP

(57) ABSTRACT

Under the present invention, a history of requests for data objects are tracked and maintained in a cache log. Based on the history, certain data objects are prefetched into a cache. When a request for a cached data object is later received, the requested data object can be retrieved from the cache and served to the requesting user. Thus, the latency involved with obtaining the data objects from the appropriate sources is eliminated. Further, under the present invention, discard and refresh rules are assigned to each data object on a class basis. Accordingly, data objects in the cache can be refreshed and/or discarded so that the caching operation can be optimized.

23 Claims, 4 Drawing Sheets

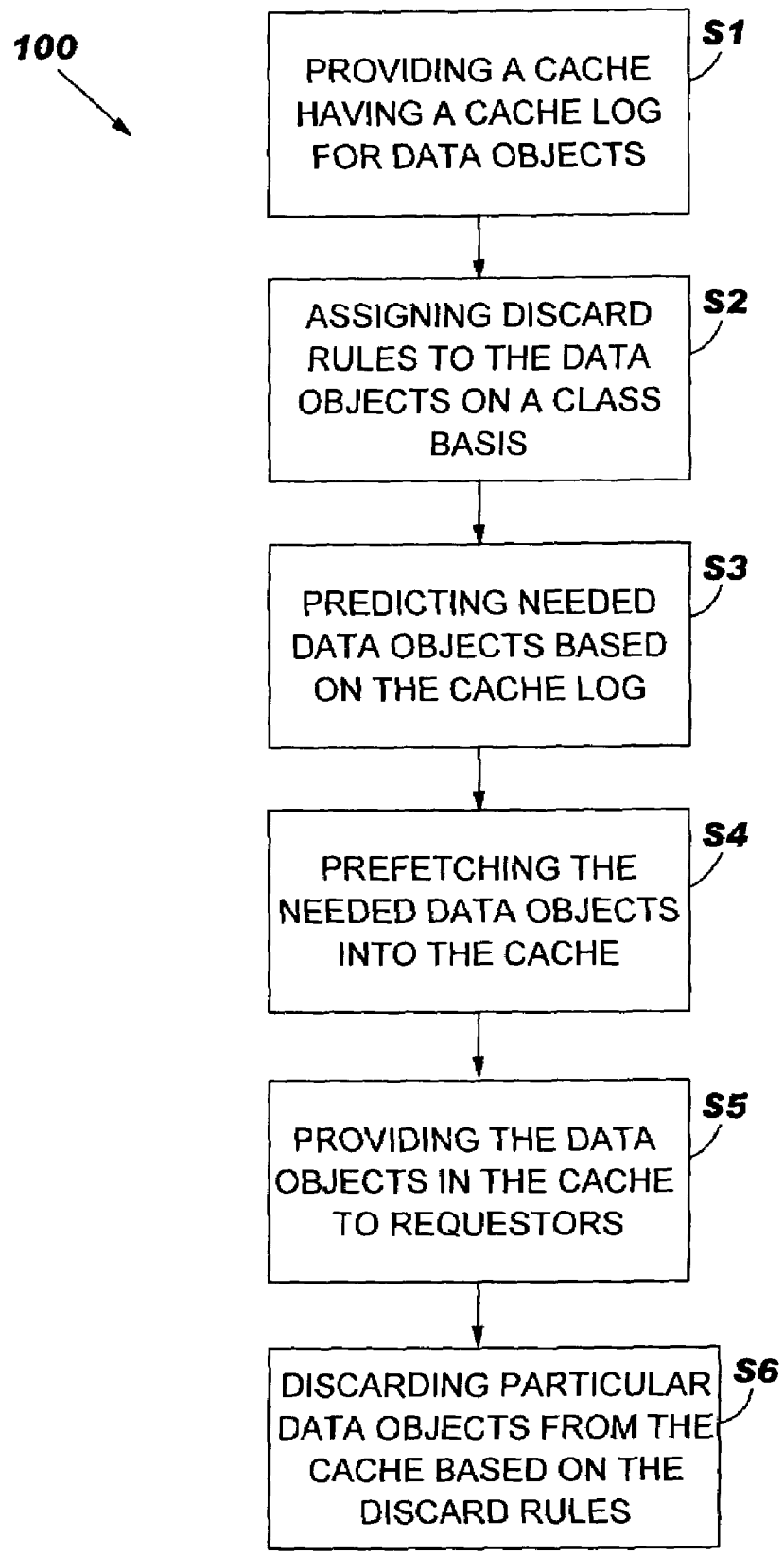

METHOD, SYSTEM AND PROGRAM PRODUCT FOR CACHING DATA OBJECTS

BACKGROUND OF THE INVENTION

1. Field of the Invention

In general, the present invention relates to a method, system and program product for caching data objects. Specifically, the present invention utilizes acceptable collaborative data age to reduce the costs associated with latency in delivering shared data by optimizing data caching operations.

2. Related Art

As the use of computer technology grows, collaborative applications are becoming more pervasive. For example, electronic mail applications, portal pages, etc. all utilize data that are intentionally shared among multiple users. As known, a portal page is generated at a web "portal" server by portal server software (e.g., WebSphere Portal Server, which is commercially available from International Business Machines Corp. of Armonk, N.Y.). A portal page typically includes sections or visual portlets that each contain certain content formatted according to a user's preferences. For example, a user could establish his/her own portal page that has sections for news, weather and sports. When the portal page is requested, the portal server would obtain the desired content from the appropriate content providers. Once obtained, the content would be aggregated for display in the appropriate sections as a portal web page. This portal technology has lead to the explosion of personalized "home" pages for individual web users.

Unfortunately, as convenient as data sharing can be, there is often a latency involved in rendering views or web pages that utilize shared data. For example, if a user requests a portal page, the portal program on the portal server will obtain and aggregate the necessary content. However, since many users might be requesting the same data at the same time and it can be distributed across several disparate systems and data stores, delays can be exhibited. Specifically, many such operations are performed synchronously with the requesting users competing for CPU time, disk and memory access, etc. Given the average salary of a "knowledge" worker can be $75,000/year or $37.50/hour, 10 seconds spent waiting for data costs approximately 10 cents. If there are 4000 "waits" (e.g., 200 users wait for 20 10-second operations) on a given server each day, it costs approximately $4000 per day, $20,000 per week or $1,040,000 per year for a single server. Such costs can greatly affect the underlying business.

In view of the foregoing, there exists a need for a method, system and program product for caching data objects. Specifically, a need exists for a system that can leverage data object caching so that latency in data delivery is minimized or eliminated. A further need exists for the caching of data objects to be controlled by refresh and discard rules so that the cache is continually optimized.

SUMMARY OF THE INVENTION

In general, the present invention provides a method, system and program product for caching data objects. Specifically, under the present invention, a history of requests for data objects are tracked and maintained in a cache log. Based on the history, certain data objects are prefetched into a cache. When a request for a cached data object is later received, the requested data object can be retrieved from the cache and served to the requesting user. Thus, the latency involved with obtaining the data objects from the appropriate sources is eliminated. Further, under the present invention, discard and refresh rules are assigned to each data object on a class basis. Accordingly, data objects in the cache can be refreshed and/or discarded so that the caching operation can be optimized.

A first aspect of the present invention provides a method for caching data objects, comprising: providing a cache having a cache log for the data objects; assigning discard rules to the data objects on a class basis; predicting needed data objects based on the cache log; prefetching the needed data objects into the cache; and discarding particular data objects from the cache based on the discard rules.

A second aspect of the present invention provides a system for caching data objects, comprising: a logger for logging a history of requests for data objects in a cache log; a predictor for analyzing the cache log and prefetching needed data objects into a cache based on the history of requests; and a request analyzer for discarding data objects from the cache based on discard rules assigned to the data objects, wherein the discard rules are assigned to the data objects on a class basis.

A third aspect of the present invention provides a program product stored on a recordable medium for caching data objects, which when executed, comprises: program code for logging a history of requests for data objects in a cache log; program code for analyzing the cache log and prefetching needed data objects into a cache based on the history of requests; and program code for discarding data objects from the cache based on discard rules assigned to the data objects, wherein the discard rules are assigned to the data objects on a class basis.

Therefore, the present invention provides a method, system and program product for caching data objects.

BRIEF DESCRIPTION OF THE DRAWINGS

These and other features of this invention will be more readily understood from the following detailed description of the various aspects of the invention taken in conjunction with the accompanying drawings in which:

FIG. 4 depicts a method flow diagram, according to the present invention.

Figure 1:
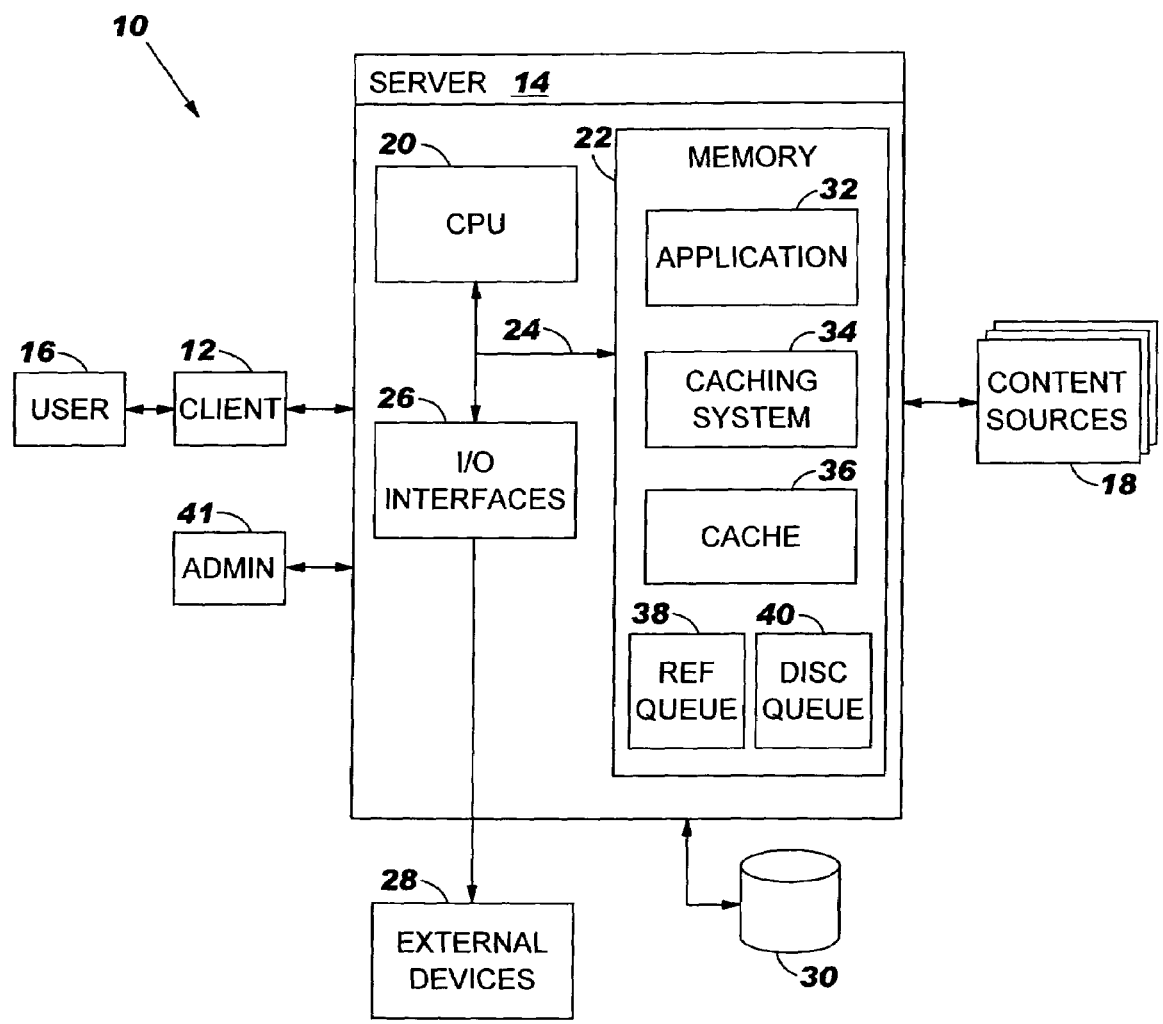
FIG. 1 depicts a system for caching data objects, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a method, system and program product for caching data objects. Specifically, under the present invention, a history of requests for data objects are tracked and maintained in a cache log. Based on the history, certain data objects are prefetched into a cache. When a request for a cached data object is later received, the requested data object can be retrieved from the cache and served to the requesting user.

Thus, the latency involved with obtaining the data objects from the appropriate sources is eliminated. Further, under the present invention, discard and refresh rules are assigned to each data object on a class basis. Accordingly, data objects in the cache can be refreshed and/or discarded so that the caching operation can be optimized.

Referring now to FIG. 1, a system 10 for caching data objects is shown. As depicted, system 10 includes client 12 that communicates with server 14 to obtain data objects. As used herein, the term "data object" is intended to mean any unit of data. Further, server 14 is intended to represent any type of server that can deliver data objects such as markup languages (e.g., web pages), views, etc. to client 12. Markup languages are well-known in the art and include not only the venerable hypertext markup language (HTML), but also extensible markup language (XML), wireless markup language (WML), and numerous variants of the standardized generalized markup language (SGML), to name a few. As will be recognized by the skilled artisan, such electronic documents include web pages, among other forms of displayable content.

In any event, server 14 could be an application server, portal server or the like. Typically, user 16 will operate client 12 to request data objects (e.g., in a web page). Server 14 will process the requests, obtain the necessary data objects from content sources 18, generate markup language including the requested data objects, and serve the markup language to client 12. To this extent, client 12 can be any type of computerized device capable of communicating with server 14. For example, client 12 could be a personal computer, a hand held device, a cellular telephone, etc.

The teachings of the present invention are typically implemented in a network environment such as the Internet, a wide area network (WAN), a local area network (LAN), a virtual private network (VPN), etc. To this extent, communication between client 12 and server 14 could occur via a direct hardwired connection (e.g., serial port), or via an addressable connection that may utilize any combination of wireline and/or wireless transmission methods. Server 14 and client 12 may utilize conventional network connectivity, such as Token Ring, Ethernet, WiFi or other conventional communications standards. Moreover, connectivity could be provided by conventional TCP/IP sockets-based protocol. In this instance, client 12 would utilize an Internet service provider to establish connectivity to server 14.

As depicted, server 14 generally comprises central processing unit (CPU) 20, memory 22, bus 24, input/output (I/O) interfaces 26, external devices/resources 28 and log 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, hand-held device, keyboard, mouse, voice recognition system, speech output system, printer, monitor/display, facsimile, pager, etc. Bus 24 provides a communication link between each of the components in server 14 and likewise may comprise any known type of transmission link, including electrical, optical, wireless, etc.

Log 30 can be any system (e.g., a file system or relational database) capable of providing storage for information under the present invention. As such, log 30 could include one or more storage devices, such as a magnetic disk drive or an optical disk drive. In another embodiment, log 30 includes data distributed across, for example, a local area network (LAN), wide area network (WAN) or a storage area network (SAN) (not shown). Although not shown, additional components, such as cache memory, communication systems, system software, etc., may be incorporated into server 14. Further, it is understood that client 12 will typically include the same components (e.g., CPU, memory, etc.) as shown and described with reference to server 14. These components have not been separately shown and discussed for brevity.

Shown in memory 22 of server 14 is application 32, which can represent any type of program that is capable of obtaining data objects for user 16. For example, application 32 could be a network-based electronic mail program such as LOTUS NOTES that renders an "inbox" view for user 16. Alternatively, application 32 can be an application server program such as WebSphere Application Server, or a portal program such as WebSphere Portal Server (both of which are commercially available from International Business Machines Corp. of Armonk, N.Y.). In the case of the latter, application 32 would receive requests from client 12 and interface with one or more portlets (not shown) to obtain the content from content providers 18. For example, if user 16 requested a personalized home page with portlets for Breaking News from AP, Technology News from Reuters and Weather, application 32 would call the Breaking News from AP, Technology from Reuters and Weather portlets, which would obtain the corresponding web content from the corresponding content providers 18.

Figure 2:
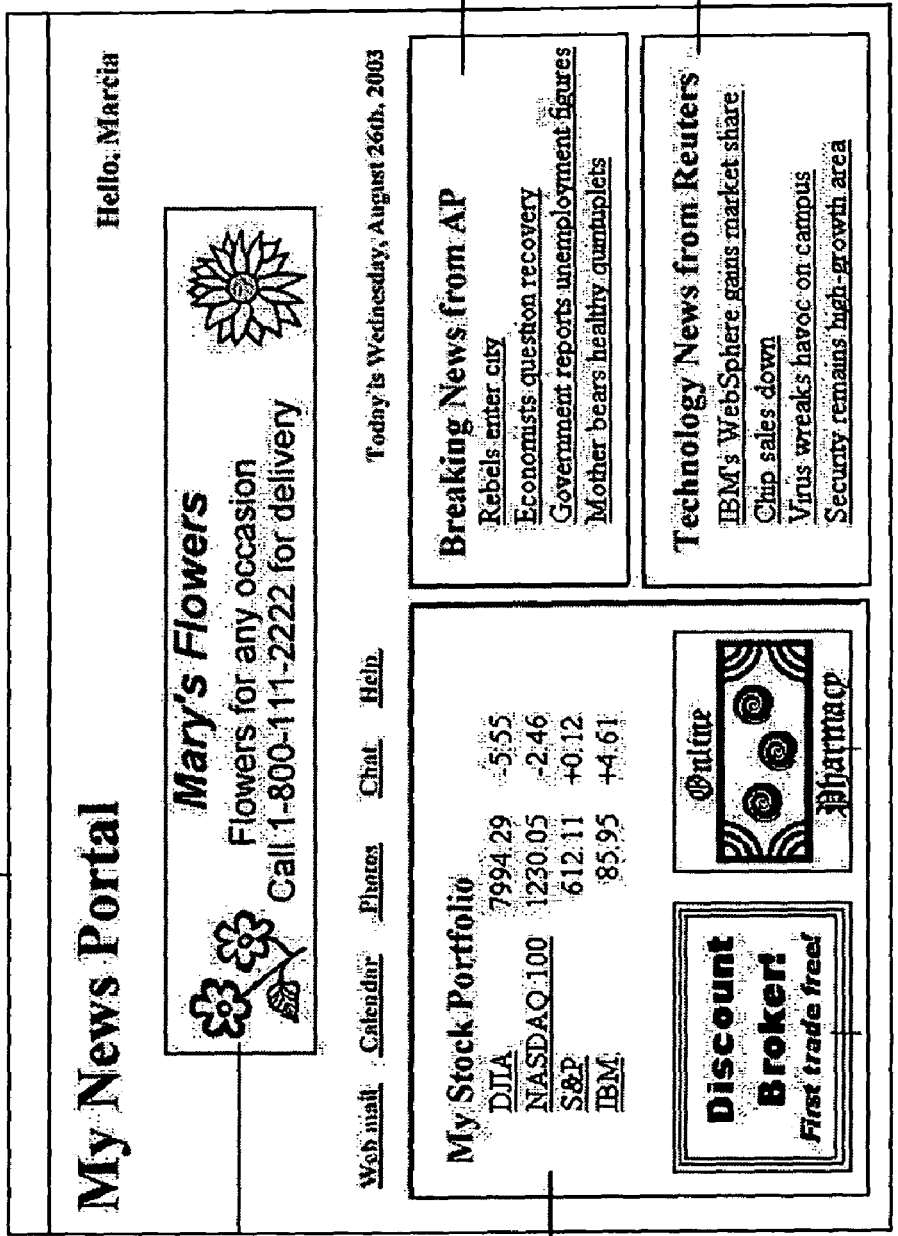
FIG. 2 depicts an illustrative web portal page with shared data objects.

Referring to FIG. 2, an illustrative portal page 42 is shown. As depicted, portal page 42 includes portlets for Breaking News from AP 44A, My Stock Portfolio 44B and Technology News from Reuters 44C. As is often the case with portal pages, many users often request the same data objects. For example, the Breaking News from AP portlet 44A might be part of the portal page for 5000 users. Due the inherent competition in processing all of the incoming the requests on server 14 (FIG. 1), users often experience delays or latency in receiving the requested data objects. As indicated above, such latency can result in considerable financial loss.

It should be appreciated that FIG. 2 shows only one possible example of data objects. For example, if application 32 is an electronic mail program, user 16 could request data objects in the form of an electronic mail "inbox" view, whereby the view is delivered from server 14, and includes data objects that are shared with other users. In this instance, content sources 18 could be one or more databases or the like from which the shared data is obtained.

In any event, to address the latency issues, the present invention provides, among other things, caching system 34. Specifically, referring back to FIG. 1, shown in memory 22 is caching system 34, cache 36, refresh queue 38 and discard queue 40. As will be further described below in conjunction with FIG. 3, caching system 34 tracks all requests for data objects received by server 14. Based on the history of requests, caching system 34 will then predict what data objects will be needed in the future, obtain those data objects from content sources 18, and store the predicted data objects in cache 36. Accordingly, when a request for a cached data object is received from user 16, interaction with content providers 18 is not necessary. Rather, the requested data object can be retrieved from cache 36 and served to client 12.

In order to provide optimal caching, all classes of data objects are registered prior to being stored in cache 36. Thereafter, discard rules and refresh rules are assigned to the data objects on a class basis. The discard rules set forth the parameters for discarding a class of data objects from cache 36 to discard queue 40. This prevents cache 36 from becoming overloaded. For example, as will be further discussed below, a discard rule could state that for a certain class, if a data object is not requested at least 5 times in a 24 hour period, that data object should be discarded from cache 36. Conversely, the refresh rules set forth the parameters for refreshing or updating the data objects in cache 36 from refresh queue 38. This prevents the data objects therein from becoming stale. For example, a refresh rule could state that all Internet web page-based data objects should be refreshed every ten minutes.

Figure 3:
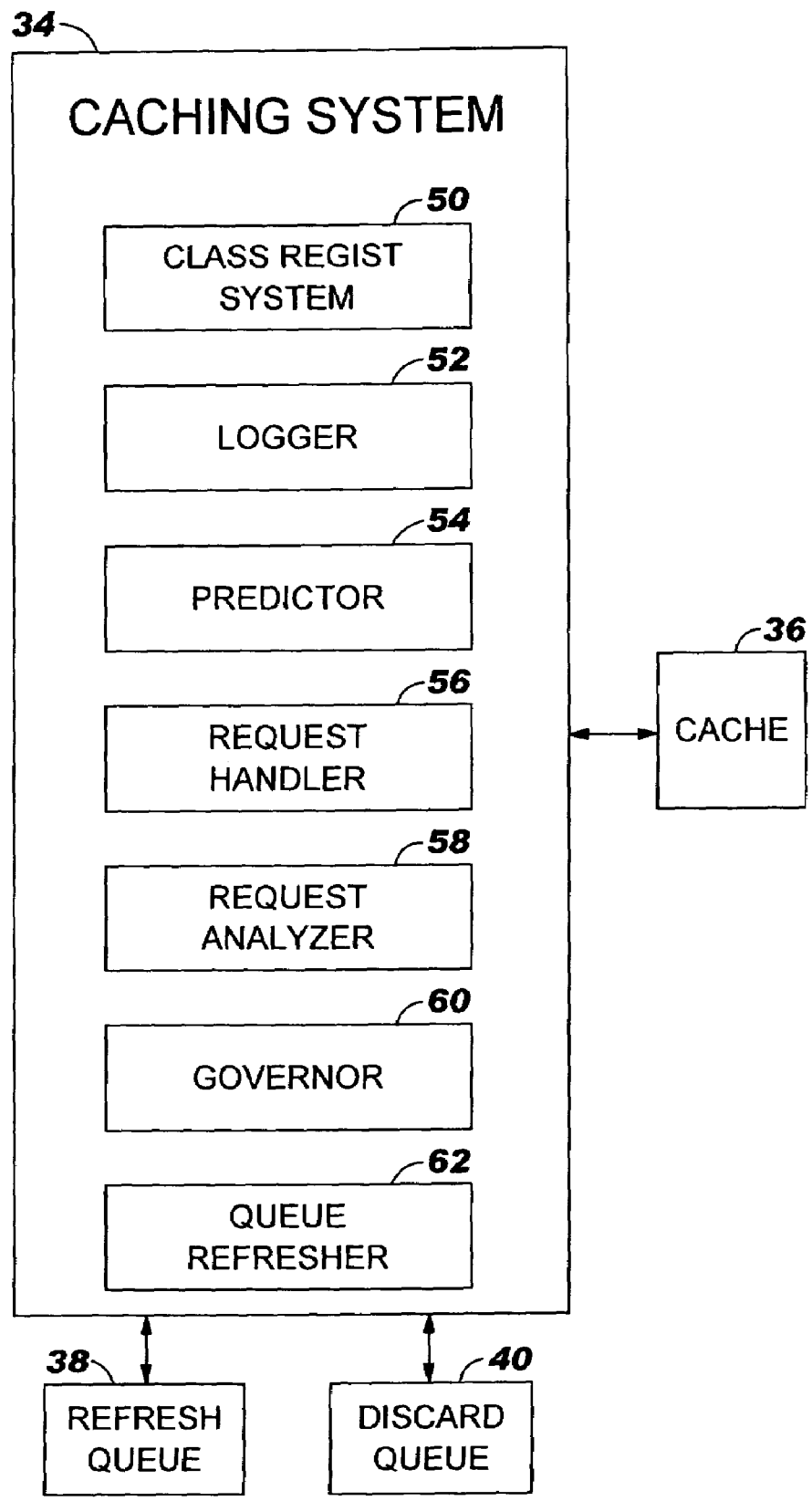
FIG. 3 depicts the caching system of FIG. 1, according to the present invention.

Referring now to FIGS. 1 and 3 collectively, the functionality of caching system 34 will be described in further detail. As indicated above, in order to cache data objects under the present invention, each class of data object is registered. Typically, this is accomplished by an administrator 41 or the like via class registration system 50. To register an object class, the "Register" method in the C++ CollabObjs could be used. For example, the following code could be employed:

```
class CollabObjs {
public:
    CollabObjs( );
    ~CollabObjs( );
    Register(const char *ObjClass, int (*UpdateObj)
    (const char*ObjName, const char *LastTime, void ** Instance));
}
``` where ObjName is the name of the cached instance.

In registering the classes, administrator 41 and/or user 16 will also assign discard rules and refresh rules to each data object class via class registration system 50. In general, objects have parametric data applied to rules defining:
  a. latency allowed (ms)
  b. predictive factor (% of days in which an instance must occur to qualify for prefetch by the Predictor 54)
  c. discard/refresh frequency (from the Predictor 54)
  d. relative or average cost to instantiate (from the Predictor 54)
  e. cached instance maximum (from the Predictor 54)
  f. memory consumption (from the Governor 60)

As indicated above, the discard rules set forth the conditions/parameters from discarding data objects (by class) from cache 36 to discard queue 40. Conversely, the refresh rules set forth the conditions/parameters for refreshing/updating a data object (by class) in cache 36 from refresh queue 38.

Once classes have been registered and rules assigned thereto, data objects can be cached. Specifically, data objects are prefetched to cache 36 under the present invention according to a predictive model. To this extent, logger 52 will track and store a history of requests for data objects in log 30 (FIG. 1). In a typical embodiment, logger 52 (asynchronously to cache operations) writes a buffered history of requests to log 30 for processing and request mining by the predictor 54. Logger 52 also deletes log entries older than a maximum log age (e.g., according to a default setting). Request trends longer than the default time could skew current processing pattern analysis.

Predictor 54 will analyze the history of web requests as tracked by logger 52, and determine which data objects should be prefetched to cache 36. Specifically, based on historical trends of requests for data objects, predictor 54 will determine data objects or sequences of data objects that will be needed in the future and prefetch those data objects into cache 36. Under the present invention, predictor 54 is an intelligent "requestor," caching object instances "pull" style in advance of when they will be historically needed. Predictor 54 requests do not typically participate in the request history. In general, there are at least three types of requesters of objects under the present invention: people; machines; and predictor 54. Distinguishing between people and machines is only problematic as it effects cost savings, but the presence of wait time between certain requests supplies a heuristic to be employed. Depending upon traffic, it is generally better to give deference to people than machines, since corporate expense is higher, but the presence of batch windows at certain times of the processing day overrides this general rule. Thus, predictor 54 is a requestor that forecasts traffic, trends and rules governing cache behavior. It can request any object that people and machines do, in fact that is its chief goal, but its requests do not participate in the cache log.

In servicing the requests to server 14, established patterns and commonly related access to objects are common. Accordingly, contributing to the caching of object instances is information mined from the log 30. Caching operations are recorded and predictive (prefetch) caching is performed when there are either consecutive sequences of object access which frequently conform to the same object sequence preamble, there are regular references to the same object instance at a given time on a given day or there are chronological predictors detected. Chronological predictors are established across multiple days, within the context of time of day and day of week. Object classes and instances can also be barred from cache 36 if the cost of instantiation is high and the predictors indicate no established pattern of access. Predictive caching is typically performed in "pull" refresh if and when needed objects are found to be out of cache 36. However, the same cost-based rationale is used to qualify objects for caching in the first place. That is, even if fetch patterns or timing indicate a gain in using prefetch, if the cost of fetching an object is sufficiently small, cache 36 is not used at all.

In general, log 30 is maintained in a relational table with the following construction:

```
Create table Cachelog (
    thedate date (date of the entry)
    Reqnum int (order of request from initialization)
Objclass int
    Objinstance varchar (30)
    Realtime time (the actual time of the request)
    Requestor varchar(30) (IP address or other identifier)
    dow int (day of week)
    tod int (time of day (minute from midnight))
    cost int (ms to fetch)
    Size int (size in bytes)
)
```

Based on log 30, listed below is an illustrative example of how predictor 54 can mine predictive trends from the data:

1. To gather the number of dates for which data has been gathered (for this day of week):

SELECT COUNT DISTINCT(thedate) FROM Cachelog WHERE dow=<this day of week>

The value gathered from this query (DAYCOUNT) will be used as a qualifier of predictive data below.

2. To find the instances historically most commonly referenced at this time on this day of the week:

SELECT COUNT(*), AVG(cost), objclass, objinstance FROM Cachelog WHERE dow=<this day of week>AND tod IS BETWEEN<now (in minutes since midnight)>+cost/1000/60-<some adjustment>AND <30 minutes from now>+cost/1000/60

GROUP BY objclass, objinstance
    ORDER BY 1 DESCENDING, 2 DESCENDING

Since there is time associated with fetching an instance, the cost is figured into the arrival time of the data object in cache 36 and <some adjustment> is subtracted to assure the presence of the instance when it is requested. Data objects are qualified by a comparison with DAYCOUNT as follows:

SELECT COUNT DISTINCT (thedate) FROM Cachelog WHERE dow=<this day of week>AND tod IS BETWEEN <now (in minutes since midnight)>+cost/1000/60-<some adjustment>AND <30 minutes from now>+cost/1000/60 AND objectclass=<this object class>AND
        objinstance=<this object instance>

If the result of this query/DAYCOUNT is less than the predictive factor for this object type, precache is not performed. This same rule is applied to the other prefetch logic examples below. Data objects are cached in this following manner when LRU is the discard metric in force.

3. To find the most prevalent, expensive and yet smallest data object instances referenced at this time on this day of the week:

SELECT COUNT(*), AVG(size), AVG(cost), objclass, objinstance FROM Cachelog WHERE dow=<this day of week>AND tod IS BETWEEN<now (in milliseconds since midnight)>+cost-<some adjustment>AND <30 minutes from now in milliseconds>+cost GROUP BY objclass, objinstance
    ORDER BY 1 DESCENDING, 2, 3 DESC Instances are cached in this manner when Size is the discard metric in force.

4. To find sequences of requests by batch processes, the following query is issued:

SELECT objclass, objinstance, reqnum, requestor, cost FROM Cachelog WHERE dow = <this day of week> OR dow =

<this day of week> + 1
      GROUP BY requestor
         HAVING COUNT(*) > <min batch stream threshold>
         ORDER BY requestor, reqnum The streams of requests are compressed and encoded and compared against each other. When a stream is found to be an exact match of another, a count of that stream is incremented. The streams with the highest occurrence counts and largest costs are candidates for predictive caching. When requests are received that match their first 3 request classes and data objects, the stream is played back as "pull" refreshes in time to satisfy each request in the stream. To cover the passing of midnight, dow of <this day of week>+1 is used and the reqnum value establishes the continuity of the stream. Streams have a minimum size of <min batch stream threshold>, which defaults to 10. This method of predictive caching is employed during periods of predominant batch processing or when the LOU cache metric is in force.

Under the present invention, predictor 54 also is used to set the object class mix in the cache by retrieving the historical average distribution of incoming requests by class according to the following code:

SELECT COUNT(*), AVG(cost), AVG(size) objclass FROM Cachelog WHERE dow=<this day of week>AND tod IS BETWEEN<now (in milliseconds since midnight)>+cost-<some adjustment>AND <30 minutes from now in milliseconds>+cost GROUP BY objclass
ORDER BY 1 DESC, 2 DESC Once predictor 54 has predicted the data objects that will likely be needed, it will prefetch those data objects from content sources 18 in cache 36. Under the present invention cache 36 includes a buffer pool with variable size blocks of data within fixed size pages. Each page has a header of pointers into its data, and the pointers are addressable by a combination of page number and slot number. Large objects spill into multiple pages via page number, slot number pointers from the previous pages. Pages are kept in memory when possible, but they are flushed when they age without being accessed. This is not the same as their data being flushed or discarded from cache 36 as will be further described below. Rather, it is a function of buffer pool management. The total size of cached data on disk is limited by the file system containing the data.

A hash table is maintained for data objects within each object class, with an upper threshold of cached instances per class. Each element for each instance in the hash table contains its:

a. Page number, slot number address
    b. Size
    c. Count of references
    d. Time of last reference
    e. Count of refreshes
    f. Total cost of refreshes (ms)
    g. Refresh Interval (ms)
    h. Time of last refresh Overflowing the class threshold forces data from cache 36. To flush data from cache 36, only its pointer needs to be removed from the hash table and made available for reuse.

After data objects are in cache 36, they can be retrieved upon request by user 16. For example, assume the data objects in the various portlets 44A–C of portal page 44 were prefetched into cache 36. Further assume that user 16 later issued a request for those data objects. In this event, the request would be received by request handler 56, which will detect the presence or absence of the data objects in cache 36. If found to be present, the request is serviced from cache 36. If not, the data objects is retrieved "pull" style and saved in cache 36, subject to any cache rules. Similarly, if an update/refresh request against a data object is received, and the data object is in hand as part of that call, request handler 56 will likewise save the instance "pull" style in cache 36. As will be further described below, all "pull" refreshes from predictor 54, request handler 56 and governor 60 are handled by the queue refresher 62 for uniform rule observance.

In order to keep cache 36 from overflowing, and to make sure data objects do not become stale, governor 60 is provided to manage refresh queue 38 and discard queue 40. Under the present invention, discard queue 40 received data objects discarded from cache 36 according to the discard rules from cache 36, while refresh queue 38 contains the list of objects being updated in cache 36 as update activity occurs in the real data according to the refresh rules. Updating cached objects from refresh queue 38 is called a "push" refresh. To support the accumulation of updates towards those thresholds, another function of refresh queue 38 is to notify the caching engine of updates against cached objects or their components.

Under the present invention, there are at least three strategies or discard rules to determine when a data object is to be placed on discard queue 40: size rank; least recently used (LRU); and least often used (LOU). Governor 60 has the job of determining which is optimal and then flagging request analyzer 58, which will actually remove the data object(s) and place it on discard queue 40. The metrics for each rule are computed as follows:

$LOU$=1/Count of References

Size rank=(Size/1000)*(1−($LOU$/1000))

$LRU$=Current time (ms)−Time of last reference (ms)

The three metrics in each instance are compared to those in other instances across object classes in an order that is set according to the desired effect. Cases when one metric would apply over another follow:
 a. LRU over size—when cache disk space is plentiful and transaction rate is high
 b. LOU over size—when cache disk space is plentiful and transaction rate is low to medium
 c. LRU over LOU—when transaction rate is high
 d. Size over LRU and LOU—when cache disk space is consumed and cached instances need to be drained
 e. LOU over LRU—when transaction rate is low to medium or there are many transactions from only a few requestors (batch processing)

The default order of comparison is LRU, LOU and size. When governor 60 chooses primary metric, a secondary is also in force. This is used to break ties and recognize the state of the system under the main state. In any event, discard queue 40 is maintained as a doubly-linked list ordered by the chosen discard metric. When a newly cached data object needs a slot, it replaces the data object with the highest discard metric unless size is in force, in which case it must discard as many instances as it takes to accommodate its size.

With respect to refresh queue 38, as normal updating of data proceeds on data stores and resultant objects instantiated, the new versions of those data objects are written to the refresh queue 38 by triggers or agents. The data for each data object resides on disk and it is inspected by the governor 60 in the order it is written. However, since the data can get arbitrarily large, governor 60 must maintain the queue file size rigorously by refreshing the largest object instances first.

Data objects written to refresh queue 38 are discarded when either they have been flushed or are about to be flushed from cache 36. If they are near the end of discard queue 40, they are also discarded. When a data object is replaced in cache 36, a new slot and space is allocated to house it, the data is written to disk in page/slot format and finally the old version's page and slot is replaced in the hash table and its memory and page(s) freed. A semaphore is only necessary for the hash table update.

As the data objects are cached, refreshed and discarded, request analyzer 58 will also continuously review and dynamically update the discard and/or refresh rules so that the caching operation provided by the present invention is optimized. For example, if a discard rule set forth a certain frequency below which data objects are discarded, and request analyzer 58 determined that the frequency was too low, it could dynamically update the frequency in the discard rules.

As indicated above, queue refresher 62 manages refresh requests from components such as predictor 54, request handler 56 and governor 60. Specifically, predictor 54, request handler 56 and governor 60 can each initiate a "pull" style refresh of a data object. To do so, they send an in-memory message to queue refresher 62, which dedicates a thread to create or update an instance of a data object and then place it into cache 36. "Pull" style refresh never fails to refresh due to the state of a cached instance since it is carefully called based upon cache state, though it can determine that no refresh is necessary.

Referring now to FIG. 4, a method flow diagram 100 according to the present invention as it processes object instances is shown. As shown, first step S1 is to provide a cache having a cache log for the data objects. Second step S2 is to assign discard rules to the data objects on a class basis. Third step S3 is to predict needed data objects based on the cache log. Fourth step S4 is to prefetch the needed data objects into the cache. Fifth step S5 is to provide data objects in the cache to requestors. Sixth step S6 is to discard particular data objects from the cache based on the discard rules.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A method for caching data objects that are registered according to classes, the method comprising:
   providing a cache having a cache log for the data objects, wherein the cache log is adapted to log a history of requests for a data object that is not stored in the cache;
   assigning discard rules to the data objects on a class basis;
   predicting needed data objects based on the cache log;
   prefetching the needed data objects that are predicted to be needed into the cache;
   discarding particular data objects from the cache based on the discard rules; and
   managing a discard queue and a refresh queue concurrently.

2. The method of claim 1, further comprising refreshing the needed data objects in the cache based on refresh rules.

3. The method of claim 2, wherein the needed data objects are refreshed from the refresh queue.

4. The method of claim 1, wherein the discarding step comprises discarding the particular data objects from the cache to the discard queue based on the discard rules.

5. The method of claim 1, further comprising:
   receiving a request for certain data objects; and
   retrieving the certain data objects from the cache.

6. The method of claim 1, wherein the cache log comprises a relational database.

7. The method of claim 1, wherein the needed data objects are predicted from a history of requests as tracked in the cache log.

8. The method of claim 1, further comprising dynamically adjusting the discard rules.

9. The method of claim 1, wherein the predicting step comprises predicting a sequence of needed data objects based on time of day.

10. A system for caching data objects, that are registered according to classes, the system comprising:
    a logger for logging a history of requests for data objects in a cache log that is adapted to log the history of requests for a data object that is not stored in the cache;
    a predictor for analyzing the cache log and prefetching needed data objects that are predicted to by into a cache based on the history of requests;
    a request analyzer for discarding data objects from the cache based on discard rules assigned to the data objects, wherein the discard rules are assigned to the data objects on a class basis and;
    a governor for concurrently managing a refresh queue and a discard queue.

11. The system of claim 10, wherein the refresh queue contains refreshed data objects, and wherein the refreshed data objects are moved from the refresh queue into the cache based on refresh rules by a queue refresher.

12. The system of claim 10, wherein the discard queue contains data objects discarded from the cache by the request analyzer based on the discard rules.

13. The system of claim 10, wherein the request analyzer further dynamically updates the discard rules.

14. The system of claim 10, further comprising a request handler for receiving a request for a certain data object and retrieving the certain data object from the cache.

15. The system of claim 10, wherein the cache log comprises a relational database.

16. The system of claim 10, wherein the predictor predicts a sequence of needed data objects and prefetches the sequence of needed data objects into the cache.

17. A program product stored on a storage medium for caching data objects, that are registered according to classes, the program when executed, comprises:
    program code for logging a history of requests for data objects in a cache log that is adapted to log the history of requests for a data object that is not stored in the cache;
    program code for analyzing the cache log and prefetching needed data objects into a cache based on the history of requests;
    program code for discarding data objects from the cache based on discard rules assigned to the data objects, wherein the discard rules are assigned to the data objects on a class basis; and
    program code for concurrently managing a refreshed queue and a discard queue.

18. The program product of claim 17, wherein the refresh queue contains refreshed data objects, and wherein the refreshed data objects are moved from the refresh queue into the cache based on refresh rules.

19. The program product of claim 17, wherein the discard queue contains data objects discarded from the cache by the program code for analyzing based on the discard rules.

20. The program product of claim 17, further comprising program code for dynamically updates the discard rules.

21. The program product of claim 17, further comprising program code for receiving a request for a certain data object and retrieving the certain data object from the cache.

22. The program product of claim 17, wherein the cache log comprises a relational database.

23. The program product of claim 17, wherein the program code for analyzing predicts a sequence of needed data objects and prefetches the sequence of needed data objects into the cache.

* * * * *